Jan. 30, 1962
B. S. BERQUIST
3,018,668
VARYING SPEED RATIO GEARING
Filed Sept. 19, 1960
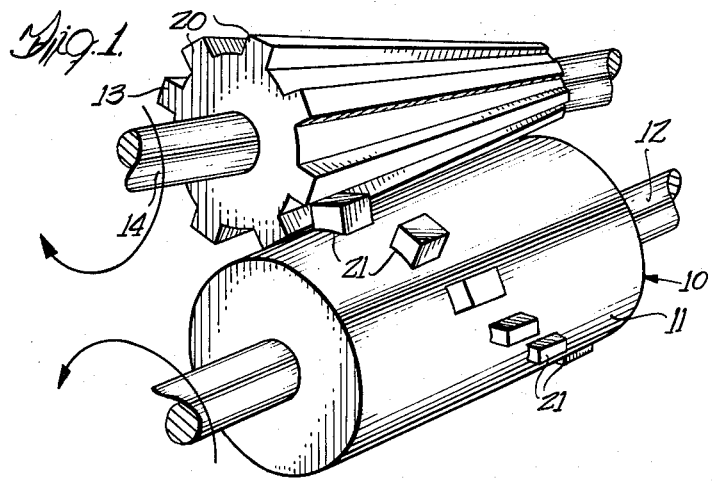
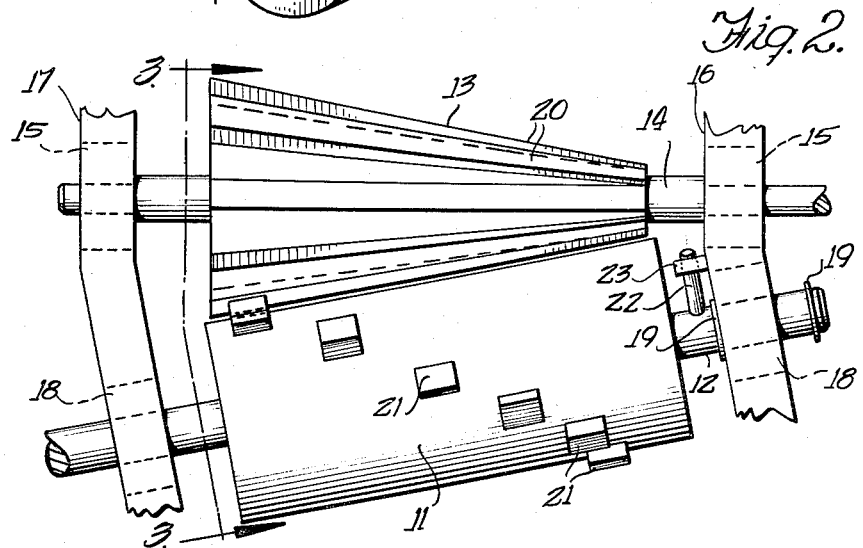
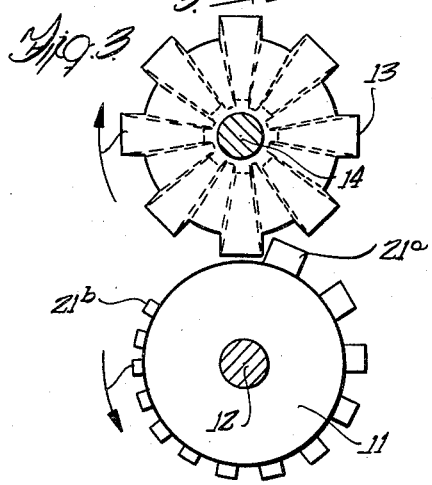
Inventor
Bruce S. Berquist
Dawson, Tilton, Fallon & Lungmus
Attorneys

United States Patent Office 3,018,668
Patented Jan. 30, 1962

3,018,668
VARYING SPEED RATIO GEARING
Bruce S. Berquist, 1925 N. Washington St., Wheaton, Ill.
Filed Sept. 19, 1960, Ser. No. 56,837
9 Claims. (Cl. 74—393)

This invention relates to varying speed ratio gearing, and more specifically, to the gear assembly particularly suitable for a self-accelerating starter mechanism.

For efficient utilization of mechanical or manual power delivered to an engine for the purpose of starting it, the ratios between the starter (drive) and engine (driven) shafts should be variable so that high torque may be applied to the driven shaft at the commencement of a starting operation. This is particularly important where the maximum power output of the starter motor is developed only within a very narrow speed range and where such power output is relatively low.

Accordingly, it is a main object of the present invention to provide a gear arrangement for a starter so that the gear ratio between the drive (starter) and driven (engine) shafts progressively changes as the latter shaft is turned by the starter. Another object is to provide a simple and highly effective gear arrangement which operatively interconnects two shafts so that upon rotation of one shaft at constant speed the second shaft will rotate at progressively increasing speed. Other objects will appear from the specification and drawings in which:

FIGURE 1 is a broken perspective view illustrating the gear arrangement of the present invention;

FIGURE 2 is a broken side elevational view showing the intermeshing gears;

FIGURE 3 is a cross sectional view taken along line 3—3 of FIGURE 2.

In the embodiment of the invention illustrated in the drawings, the numeral 10 generally designates the gear arrangement for a starter mechanism. Only two gears are provided: a drive gear 11 carried by the drive or starter shaft 12 and a driven gear 13 carried by driven shaft 14. The driven shaft may be the main shaft of an engine, such as an internal combustion engine, or it may be a shaft which is geared or otherwise operatively connected to the crank shaft of such an engine. Shaft 12 may likewise be the main shaft of a starter motor, or a shaft operatively connected to such a motor. Alternatively, shaft 12 may be equipped with a crank handle, a pull cord and pulley, or any other suitable means for permitting manual rotation of that shaft.

The axes of the gears and shafts extend along a single plane and are divergent. Shaft 14 is journaled in bearings 15 provided by support members 16 and 17 and, as shown most clearly in FIGURE 2, the portion of the shaft disposed between these members is of enlarged diameter so as to prevent axial movement of the shaft without at the same time restraining rotational movement thereof. Shaft 12 is similarly journaled in bearings 18 carried by the support members 16 and 17 but, unlike shaft 14, shaft 12 is capable of limited axial movement. Any suitable means might be provided to limit the extent of such movement and, in the illustration given, I have shown a pair of C rings 19 connected to the shaft 12 for this purpose.

Gear 13 is a bevel gear with an axial dimension substantially greater than its largest diameter. Teeth 20 are uniformly and circumferentially spaced and extend along radial planes passing through the rotational axis of the gear.

Gear 11 is generally cylindrical in shape and is provided with a spiral arrangement of tooth segments 21 adapted to mesh with the teeth of gear 13 at different points along the length of that gear. The word "spiral" is here used to mean that the series of teeth or tooth segments extends axially as well as circumferentially and is not meant to imply that the ends of the series overlap or are in parallel relation with each other. As shown in FIGURE 3, the series of teeth 21 does not complete the full 360 degree arc of gear 11 but, instead, a circumferential as well as axial space is provided between the first tooth 21a and the last tooth 21b of the series.

So that teeth 21 can be received within the axially tapered grooves or spaces between teeth 20 of gear 13, the teeth of gear 11 gradually diminish in their root dimensions from the beginning to the end of the series. The pitch root dimensions also gradually decrease and, as shown in FIGURE 3, the faces or heights of the teeth may progressively diminish although such a change in height is not necessary if the grooves are of uniform depth throughout their length.

If desired, shaft 12 may be provided with a lug 22 adapted to engage a stop 23 provided by support member 16 for the purpose of limiting rotation of gear 11 to a single revolution. Stop 23 and lug 22 are oriented so that contact occurs only when the arcuate circumferential space between the first and last tooth segments of the series faces bevel gear 13, assuming that gear 11 is capable of rotating only in a single direction as indicated in the drawings. In other words, stop 23 will act to prevent further rotation of gear 11 after the last tooth segment 21b of the series has engaged and then disengaged gear 13, thereby permitting the bevel gear to rotate independently of gear 11. The two gears may again be brought into intermeshing relation by shifting gear 11 and shaft 12 axially so that lug 22 clears stop 23. Then, with gear 11, in the returned position illustrated in FIGURES 2 and 3, it may again be rotated to drive bevel gear 13.

While I have shown the maximum diameter of the driven gear to be approximately the same as the diameter of the drive gear, it will be understood that a substantial size differential may exist, depending on the number of revolutions of the driven shaft 14 necessary or desirable for a single revolution of the drive shaft 12 during a starting cycle and also depending upon the power of the starter and the starting resistance of the engine. With the size relationship shown in the drawings, driven gear 13 and shaft 14 will be rotated about one and one-half times for a single rotation of drive gear 11. By increasing the diameter of the drive gear, a proportionately greater number of rotations of the bevel gear may be obtained in a single starting cycle.

In operation, drive shaft 12 and drive gear 11 are rotated in the direction indicated by the arrows in FIGURES 1 and 3. The foremost tooth segment 21a of the spiral series engages a tooth of the bevel gear and the latter is driven in the direction indicated in the drawings. For a constant rotational speed of drive gear 11, driven gear 13 progressively increases in angular velocity because of the increasing size differential between the gears in the areas of subsequent intermeshing contact. At the end of a single revolution at constant speed of drive gear 11, driven gear 13 and shaft 14 accelerate from approximately the same angular velocity as the drive gear to about three times that velocity. The final velocity of the driven shaft depends, of course, upon the size relationship of the two gears at the smaller end of the driven gear and upon the final rotational speed of the drive gear.

I have described shaft 12 as the drive shaft of relatively constant rotational speed and shaft 14 as the driven shaft which is driven at increasing speed by the intermeshing gears 11 and 13. It is to be understood, however, that the parts might be reversed and that shaft 14 and gear 13 might constitute the drive shaft and drive gear respectively. In such a case, if shaft 14 is rotated at relatively constant angular velocity in the direction opposite to the direction of the arrow shown in FIGURE 1, driven gear 11, when meshed with drive gear 13, will rotate at increasing speed in a direction opposite the indicated direction of rotation.

While in the foregoing specification I have disclosed an embodiment of the invention in considerable detail for purposes of illustration, it is to be understood by those skilled in the art that many of these details may be varied without departing from the spirit and scope of the invention.

I claim:

1. A starter gear mechanism comprising a drive shaft and a driven shaft extending in non-parallel relation along the same plane, one of said shafts being provided with a generally cylindrical gear and the other of said shafts being provided with an axially-elongated conical gear, one of said gears having teeth extending longitudinally from one end to the other end thereof, and the other of said gears being provided with a series of tooth segments extending in a spiral of less than 360 degrees thereabout for intermeshing with the teeth of said one gear at different points along the length thereof, the tooth segments at the ends of said series being spaced circumferentially apart a distance sufficient to permit free rotation of said one of said gears when the space between the end segments faces said one gear.

2. The structure of claim 1 in which the root dimensions of said tooth segments progressively decrease from one end of said series to the other.

3. In a starter gear mechanism, a drive shaft and a driven shaft angling towards each other along the same plane, one of said shafts being provided with a generally cylindrical gear and the other of said shafts being provided with an axially-elongated conical gear, one of said gears having teeth extending longitudinally from one end to the other end thereof, the other of said gears being provided with a series of tooth segments extending in a spiral of less than 360 degrees thereabout for intermeshing with the teeth of said one gear at different points along the length thereof, the tooth segments at the ends of said series being spaced circumferentially apart a distance sufficient to permit free rotation of said one gear when the space between the end segments directly faces said one gear, means rotatably supporting said shafts, said means being equipped with a stop for interrupting rotation of said other of said gears when the space between the end tooth segments faces said one gear, said other gear also being supported for limited axial movement relative to said one gear for clearing said stop.

4. The structure of claim 3 in which said one of said gears is of cylindrical shape and said other of said gears is of conical shape.

5. The structure of claim 3 in which the root dimensions of said tooth segments progressively decrease from one end of said series to the other.

6. In a starter mechanism, a drive shaft and a driven shaft, one of said shafts being provided with an axially-elongated gear of generally cylindrical shape and the other of said shafts being provided with an axially-elongated gear of generally conical shape, said conical gear having teeth extending longitudinally from one end to the other end thereof, and said cylindrical gear being provided with a series of tooth segments extending in a spiral of less than 360 degrees thereabout for intermeshing with the teeth of said conical gear at different points along the length thereof.

7. The structure of claim 6 in which the tooth segments at the ends of said series are spaced circumferentially apart a distance sufficient to permit free rotation of said conical gear when the space between the end segments faces said conical gear.

8. A variable speed ratio gearing arrangement comprising a drive shaft and a driven shaft, one of said shafts being provided with an axially-elongated gear of generally cylindrical shape and the other of said shafts being provided with an axially-elongated gear of generally conical shape, one of said gears having teeth extending longitudinally from one end to the other end thereof, and the other of said gears being provided with an axially extending spiral arrangement of tooth segments adapted to mesh with the teeth of said one gear at different points along the length thereof, said spiral arrangement of tooth segments extending less than 360 degrees around said other of said gears.

9. A varying speed ratio gearing arrangement comprising a drive shaft and a driven shaft, one of said shafts being provided with an axially-elongated gear of generally cylindrical shape and the other of said shafts being provided with an axially-elongated gear of generally conical shape, one of said gears having teeth extending longitudinally from one end to the other end thereof, and the other of said gears being provided with an axially extending spiral arrangement of tooth segments adapted to mesh with the teeth of said one gear at different points along the length thereof, the root dimensions of the tooth segments of said spiral arrangement decreasing progressively.

References Cited in the file of this patent

UNITED STATES PATENTS

| | | |
|---|---|---|
| 32,733 | Young | July 2, 1861 |
| 1,281,734 | Wingquist | Oct. 15, 1918 |
| 2,179,841 | Cassidy | Nov. 14, 1939 |
| 2,349,118 | Simpson | May 16, 1944 |

FOREIGN PATENTS

| | | |
|---|---|---|
| 1,847 | Great Britain | Jan. 23, 1914 |
| 88,611 | Switzerland | Mar. 16, 1921 |
| 362,620 | Italy | Aug. 31, 1937 |